(12) United States Patent
Wakashima et al.

(10) Patent No.: US 11,837,414 B2
(45) Date of Patent: Dec. 5, 2023

(54) MULTILAYER CERAMIC CAPACITOR PACKAGE

(71) Applicant: Murata Manufacturing Co., Ltd., Nagaokakyo (JP)

(72) Inventors: Masahiro Wakashima, Nagaokakyo (JP); Yuta Saito, Nagaokakyo (JP); Akito Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 119 days.

(21) Appl. No.: 17/495,854

(22) Filed: Oct. 7, 2021

(65) Prior Publication Data

US 2022/0139633 A1 May 5, 2022

(30) Foreign Application Priority Data

Nov. 2, 2020 (JP) .................... 2020-183639

(51) Int. Cl.
*H01G 4/38* (2006.01)
*H01G 4/30* (2006.01)
*H01G 4/12* (2006.01)
*H01G 4/232* (2006.01)
*H01G 4/248* (2006.01)

(52) U.S. Cl.
CPC ............. *H01G 4/38* (2013.01); *H01G 4/1227* (2013.01); *H01G 4/2325* (2013.01); *H01G 4/248* (2013.01); *H01G 4/30* (2013.01)

(58) Field of Classification Search
None
See application file for complete search history.

(56) References Cited

U.S. PATENT DOCUMENTS

| 8,947,851 | B2 * | 2/2015 | Koizumi | H01G 4/1227 |
| | | | | 361/321.2 |
| 10,319,658 | B2 * | 6/2019 | Suga | H01L 23/3192 |
| 10,586,652 | B1 * | 3/2020 | Kwon | H01G 4/224 |
| 2005/0167243 | A1 | 8/2005 | Yagi | |

(Continued)

FOREIGN PATENT DOCUMENTS

| CN | 103314420 A | 9/2013 |
| CN | 104590739 A | 5/2015 |

(Continued)

OTHER PUBLICATIONS

Office Action in KR10-2021-0141228, dated Mar. 12, 2023, 4 pages.

(Continued)

*Primary Examiner* — Dion R. Ferguson
(74) *Attorney, Agent, or Firm* — Keating & Bennett, LLP

(57) ABSTRACT

A multilayer ceramic capacitor package accommodating multilayer ceramic capacitors includes a carrier tape that is elongated and includes recess pockets at equal or substantially equal intervals in a longitudinal direction, a cover tape that is elongated and attached to the carrier tape to cover an opening of each of the pockets, and the multilayer ceramic capacitors respectively accommodated in the pockets. In the multilayer ceramic capacitor package, in adjacent multilayer ceramic capacitors, a difference in densities of surfaces on an opening side of the pockets is about 0% or more and about 4% or less.

19 Claims, 7 Drawing Sheets

(56) References Cited

U.S. PATENT DOCUMENTS

| | | | | |
|---|---|---|---|---|
| 2012/0313489 A1* | 12/2012 | Shirakawa | ............ | H01G 4/012 336/200 |
| 2013/0114182 A1* | 5/2013 | Suh | ........................ | H01G 4/018 361/321.2 |
| 2013/0208399 A1 | 8/2013 | Morita et al. | | |
| 2015/0114695 A1 | 4/2015 | Shimizu et al. | | |
| 2015/0196936 A1 | 7/2015 | Sasaoka | | |
| 2016/0196918 A1* | 7/2016 | Hong | ..................... | H01G 4/232 361/301.4 |
| 2017/0018363 A1 | 1/2017 | Tanaka et al. | | |
| 2018/0108482 A1* | 4/2018 | Kogure | .................. | H01G 4/224 |
| 2019/0304700 A1* | 10/2019 | Hong | ................... | H01G 4/0085 |
| 2020/0343048 A1* | 10/2020 | Yokomizo | ............... | H01G 4/30 |
| 2021/0151255 A1* | 5/2021 | Tahara | .................... | H01G 4/232 |
| 2022/0139633 A1* | 5/2022 | Wakashima | ............. | H01G 4/30 361/301.4 |

FOREIGN PATENT DOCUMENTS

| | | | | | |
|---|---|---|---|---|---|
| JP | 2005217136 A | | 8/2005 | | |
| JP | 2007-145340 A | | 6/2007 | | |
| JP | 2015147618 A | | 8/2015 | | |
| JP | 2015222833 A | | 12/2015 | | |
| JP | 2017028013 A | | 2/2017 | | |
| JP | 2018125467 A | * | 8/2018 | .......... | B65D 75/367 |
| JP | 2019106528 A | | 6/2019 | | |
| JP | 2020141091 A | | 9/2020 | | |
| KR | 20110065623 A | * | 6/2011 | | |
| KR | 1020130049295 A | | 5/2013 | | |
| KR | 1020200027864 A | | 3/2020 | | |

OTHER PUBLICATIONS

Murata Manufacturing Co., Ltd., "Chip Laminated Ceramic Capacitor," Retrieved from Internet: <https://search.murata.co.jp/Ceramy/image/img/A01X/G101/JPN/GRM0336T1HR20BD01-01.pdf>, Apr. 2012, 29 pages.

Office Action in JP2020-183639, dated May 23, 2023, 4 pages.

Official Communication issued in corresponding Chinese Patent Application No. 202111218387.4, dated Jan. 19, 2023.

* cited by examiner

MULTILAYER CERAMIC CAPACITOR PACKAGE

CROSS REFERENCE TO RELATED APPLICATIONS

This application claims the benefit of priority to Japanese Patent Application No. 2020-183639 filed on Nov. 2, 2020. The entire contents of this application are hereby incorporated herein by reference.

BACKGROUND OF THE INVENTION

1. Field of the Invention

The present invention relates to a multilayer ceramic capacitor package.

2. Description of the Related Art

As a package of a multilayer ceramic capacitor, an elongated or strip-shaped multilayer ceramic capacitor package corresponding to a mounter for automatic mounting has been known (for example, refer to Japanese Patent Application Publication No. 2007-145340). Such a multilayer ceramic capacitor package includes a carrier tape having a plurality of recess pockets arranged at equal intervals in the longitudinal direction, and a cover tape affixed to the carrier tape so as to cover the openings of the plurality of pockets. The multilayer ceramic capacitor is housed (contained) in each of the plurality of pockets.

With such a multilayer ceramic capacitor package, when mounting the multilayer ceramic capacitor on a mounting board or the like using a mounter, the surface of the multilayer ceramic capacitor is sucked from the opening side of the pocket by the mounter, such that the multilayer ceramic capacitor is removed from the pocket. The surface of the multilayer ceramic capacitor may sometimes be cracked during this process.

SUMMARY OF THE INVENTION

Preferred embodiments of the present invention provide multilayer ceramic capacitor packages that are each able to reduce or prevent the cracking of the surface of a multilayer ceramic capacitor when mounting.

The inventors of preferred embodiments of the present invention have discovered that one of the causes of cracking of the surface of the multilayer ceramic capacitor when mounting the multilayer ceramic capacitor on a mounting board or the like using a mounter is variations in the density of the surface of the opening side of the pocket in the multilayer ceramic capacitor.

A preferred embodiment of the present invention provides a multilayer ceramic capacitor package accommodating a plurality of multilayer ceramic capacitors, and the multilayer ceramic capacitor package includes a carrier tape that is elongated and includes a plurality of recess pockets at equal or substantially equal intervals in a longitudinal direction, a cover tape attached to the carrier tape to cover an opening of each of the plurality of pockets, and the plurality of multilayer ceramic capacitors respectively accommodated in the plurality of pockets. In the multilayer ceramic capacitor package, in adjacent multilayer ceramic capacitors among the plurality of multilayer ceramic capacitors, a difference in densities of surfaces on an opening side of the pockets is about 0% or more and about 4% or less.

According to preferred embodiments of the present invention, it is possible to provide multilayer ceramic capacitor packages that are each able to reduce or prevent cracking of the surface of a multilayer ceramic capacitor when mounting.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
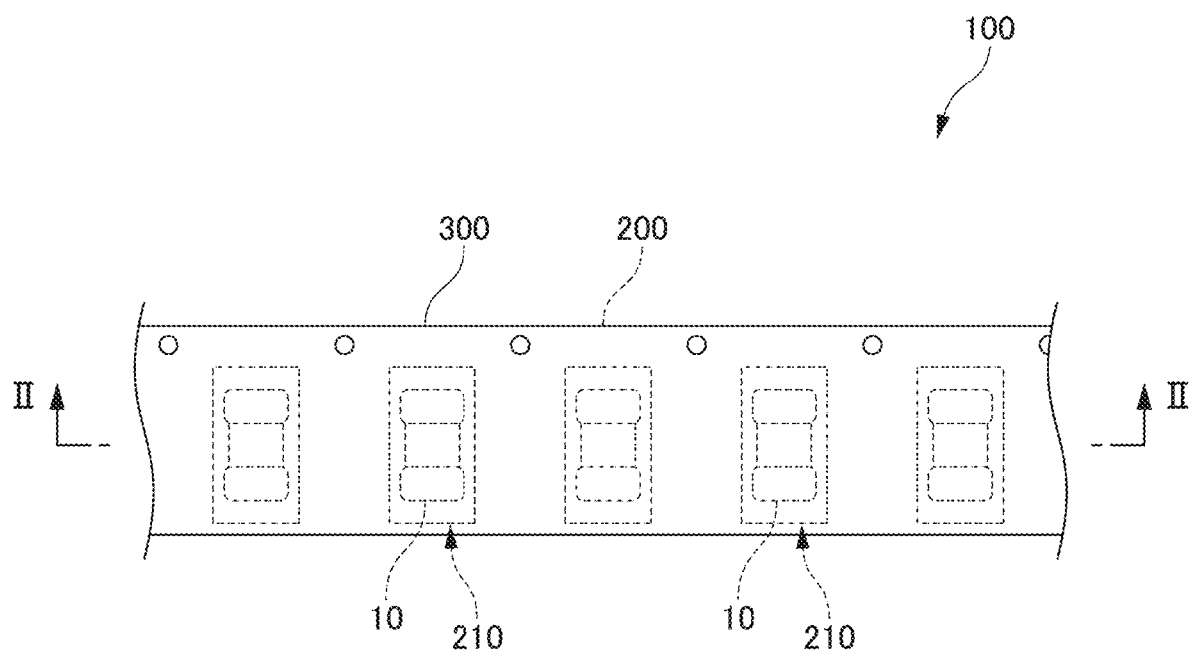
FIG. 1 is a plan view showing a multilayer ceramic capacitor package according to a preferred embodiment of the present invention.

Hereinafter, examples of preferred embodiments of the present invention will be described with reference to the attached drawings. The same reference numerals are used for the same or corresponding components in the drawings.

Multilayer Ceramic Capacitor

Figure 3:
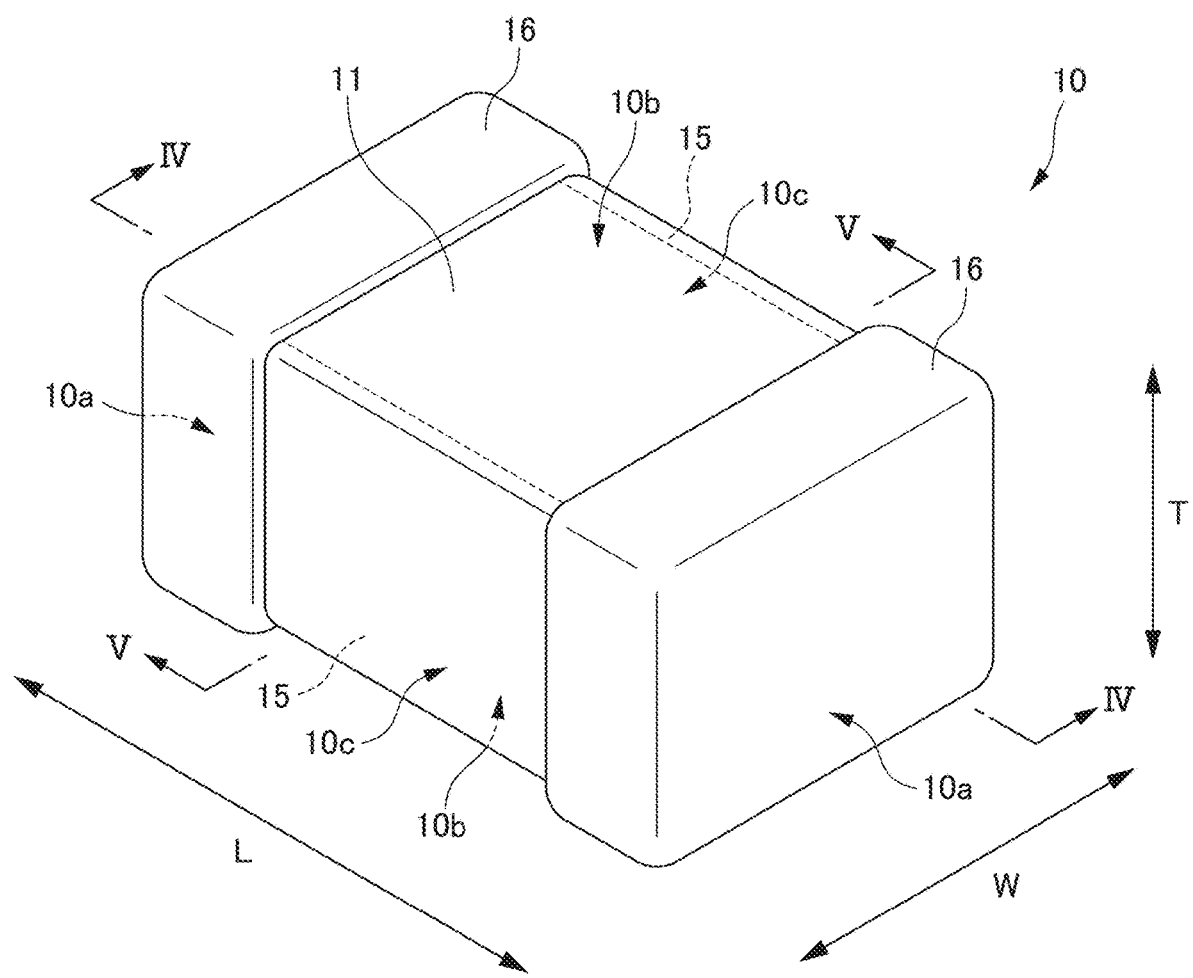
FIG. 3 is a schematic perspective view of the multilayer ceramic capacitor shown in FIGS. 1 and 2.
Figure 4:
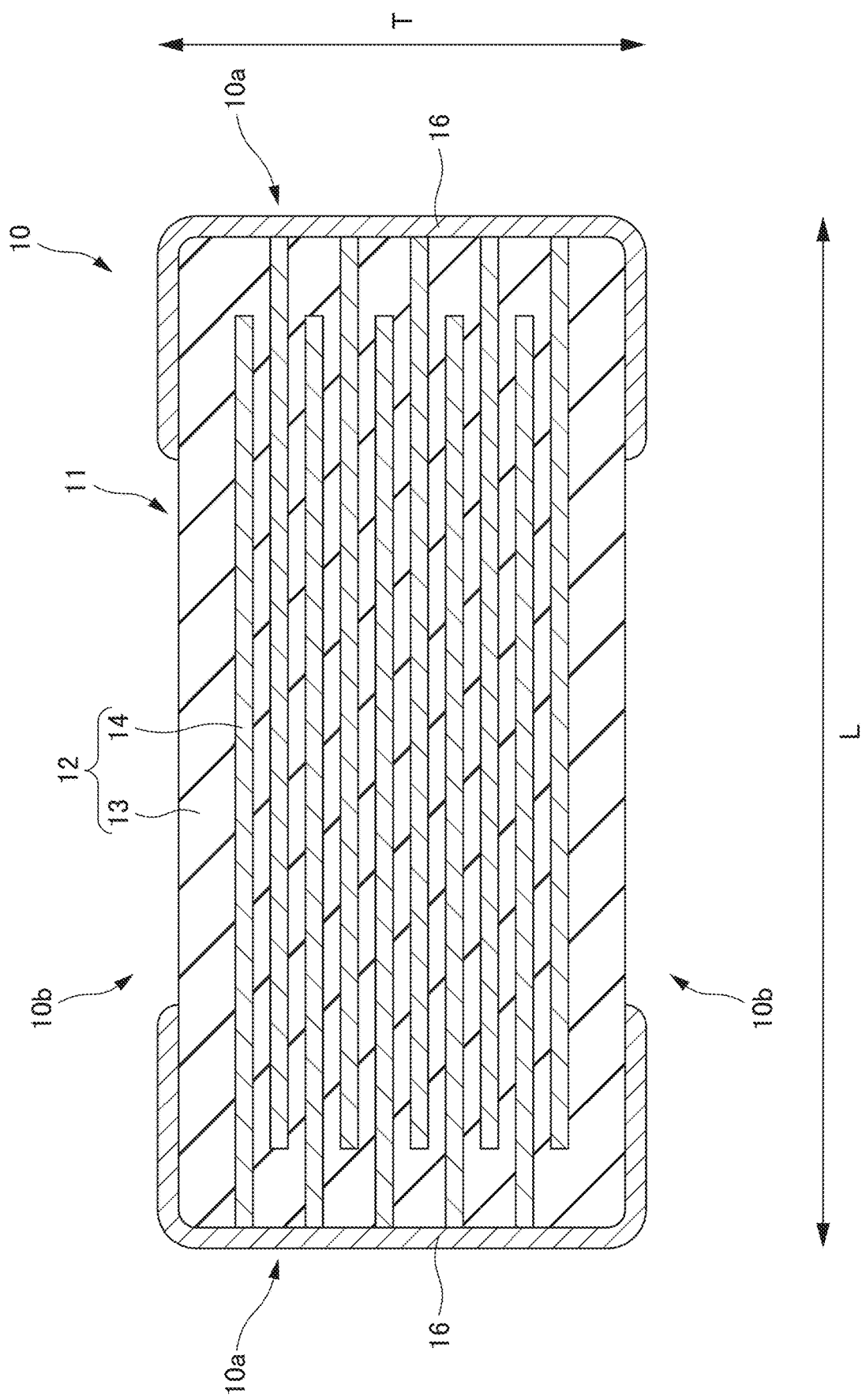
FIG. 4 is a cross-sectional view along the line IV-IV of the multilayer ceramic capacitor shown in FIG. 3.
Figure 5:
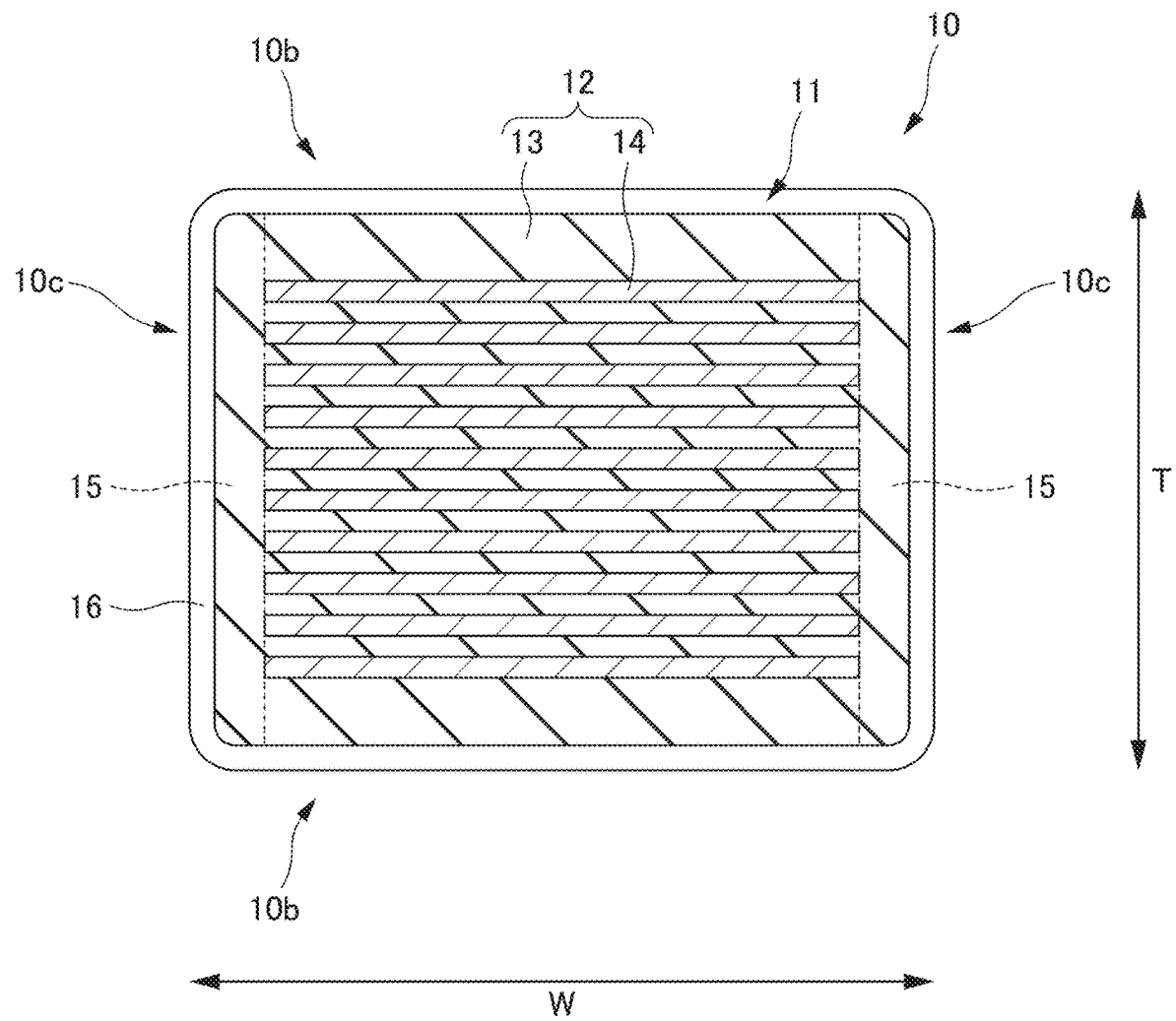
FIG. 5 is a cross-sectional view along the V-V line of the multilayer ceramic capacitor shown in FIG. 3.
Figure 6:
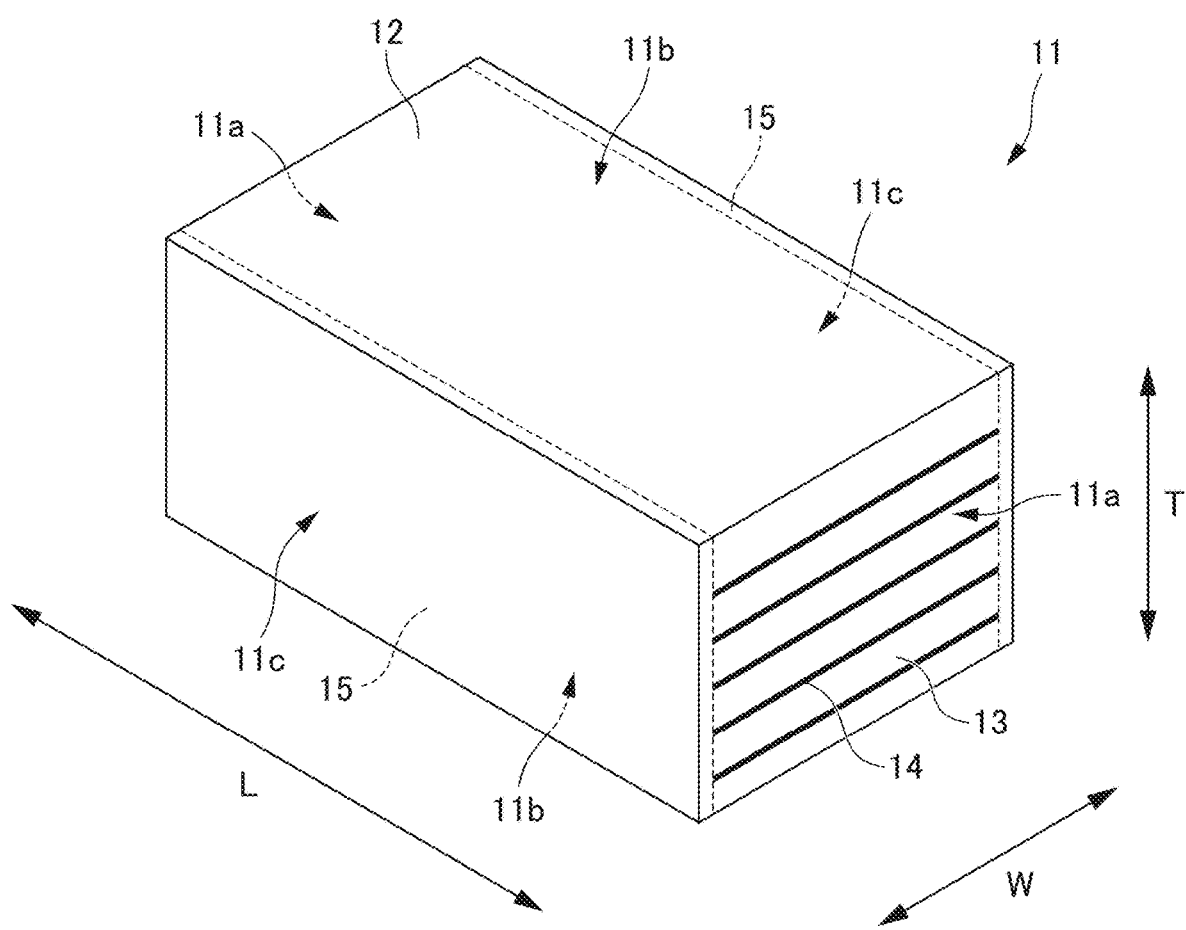
FIG. 6 is a schematic perspective view of only a base body of the multilayer ceramic capacitor shown in FIG. 3.
Figure 7:
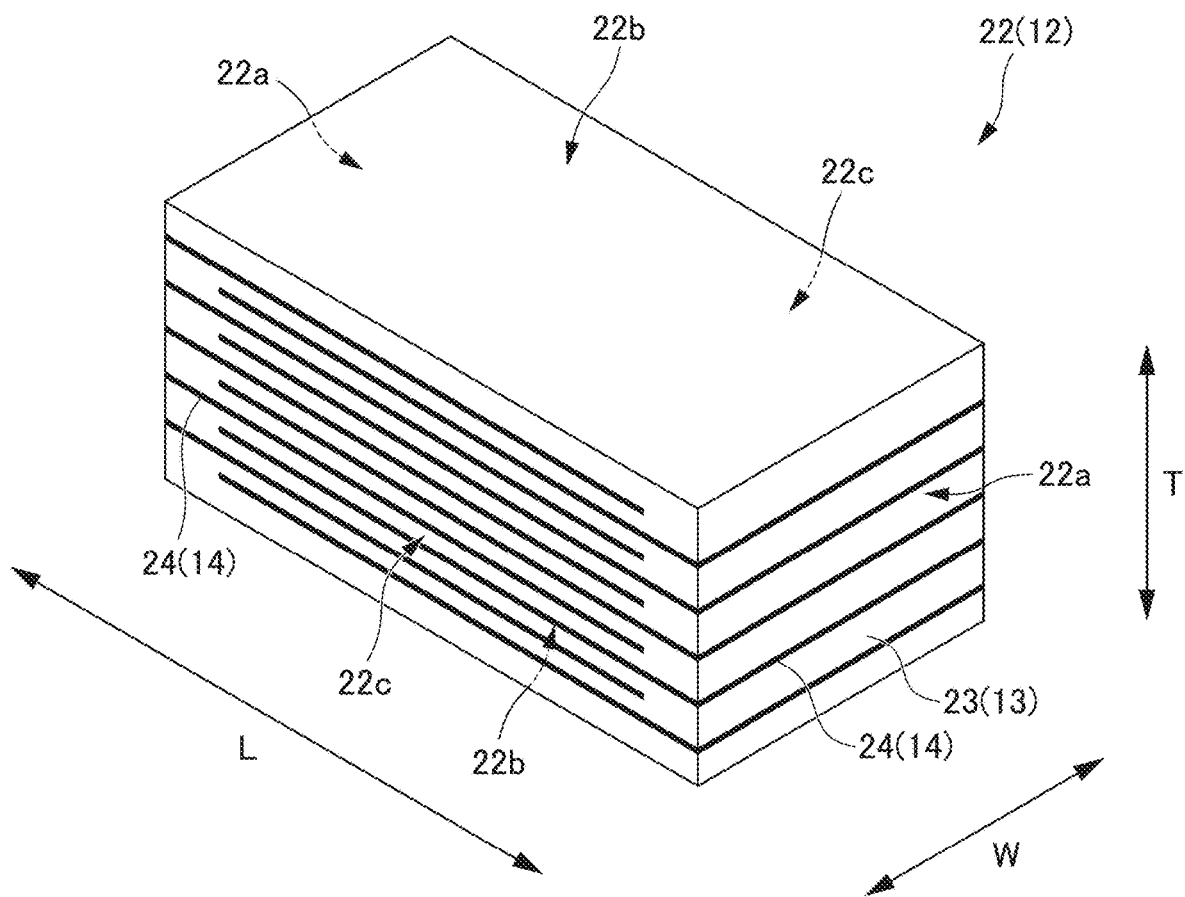
FIG. 7 is a schematic perspective view of a laminate chip which is a precursor of a multilayer body defining a portion of the base body shown in FIG. 6.

First, a multilayer ceramic capacitor to be accommodated (housed) (included) in a multilayer ceramic capacitor package according to a preferred embodiment will be described with reference to FIGS. 3 to 7. FIG. 3 is a schematic perspective view of the multilayer ceramic capacitor 10 according to the present preferred embodiment. FIG. 4 is a cross-sectional view along the line IV-IV of the multilayer ceramic capacitor shown in FIG. 3, and FIG. 5 is a cross-sectional view along the line V-V of the multilayer ceramic capacitor 10 shown in FIG. 3. Furthermore, FIG. 6 is a schematic perspective view of only a base body 11 of the multilayer ceramic capacitor 10 shown in FIG. 3, and FIG. 7 is a schematic perspective view of the laminate chip 22 which is a precursor of the multilayer body 12 defining a portion of the base body 11 shown in FIG. 6.

As shown in FIGS. 3 to 5, the multilayer ceramic capacitor 10 is an electronic component having a rectangular or substantially rectangular parallelepiped shape, and includes the base body 11 and a pair of external electrodes 16.

As shown in FIGS. 3 and 4, the pair of external electrodes 16 is spaced apart from each other and cover the outer surfaces of both end portions in a predetermined direction of the base body 11. The pair of external electrodes 16 includes conductive films.

More specifically, the pair of external electrodes 16 include a laminated film including, for example, a sintered metal layer and a plated layer. The sintered metal layer is formed, for example, by firing a paste such as Cu, Ni, Ag, Pd, Ag—Pd alloy, and Au. The plated layer includes, for example, a Ni-plating layer and a Sn-plating layer covering the Ni-plating layer. The plated layer may include, for example, a Cu-plating layer and/or a Au-plating layer, instead of the Ni-plating layer and the Sn-plating layer. Furthermore, the pair of external electrodes 16 may include only the plated layer. Furthermore, for example, a conductive resin paste can be used as the pair of external electrodes 16.

As shown in FIGS. 4 to 6, the base body 11 includes the multilayer body 12 including dielectric layers 13 and internal electrode layers 14 laminated (stacked) alternately in a predetermined direction, and a pair of additional dielectric portions 15 covering a predetermined portion of the multilayer body 12. The dielectric layers 13 are an example of a ceramic layer, and the internal electrode layers 14 are an example of an internal electrode. The additional dielectric portion 15 may be referred to as a side gap portion.

The dielectric layers 13 and the additional dielectric portions 15 include, for example, a ceramic material including barium titanate as a main component. In addition, the dielectric layers 13 and the additional dielectric portions 15 may include, for example, Mn compounds, Mg compounds, Si compounds, Co compounds, Ni compounds, rare earth compounds, and the like as sub-components of the ceramic powder used as the raw material of a ceramic green sheet. The internal electrode layers 14 preferably include, for example, a metallic material such as Ni, Cu, Ag, Pd, Ag—Pd alloy, and Au.

As shown in FIG. 4, one of the pair of internal electrode layers 14 adjacent to each other in the lamination direction with one of the dielectric layers 13 interposed therebetween is electronically connected to one of the pair of external electrodes 16 within the multilayer ceramic capacitor 10, and the other one of the pair of internal electrode layer 14 adjacent to each other in the lamination direction with one of the dielectric layers 13 interposed therebetween is electronically connected to the other one of the pair of external electrodes 16 within the multilayer ceramic capacitor 10. Thus, various capacitor elements are electrically connected in parallel between the pair of external electrodes 16.

It should be noted that the materials of the dielectric layers 13 and the additional dielectric portions 15 are not limited to the above-described ceramic materials mainly including barium titanate, and other high permittivity ceramic materials (for example, materials mainly containing $CaTiO_3$, $SrTiO_3$, $CaZrO_3$ or the like) may be selected as the materials of the dielectric layers 13 and the additional dielectric portions 15. Furthermore, it is not necessary to match the material of the additional dielectric portions 15 and the material of the dielectric layers 13, and ceramic materials including different main components may be used for the material of the dielectric layers 13 and the materials of the additional dielectric portions 15. Furthermore, for the additional dielectric portions 15, a resin material which is a non-ceramic material may be used. On the other hand, the material of the internal electrode layers 14 is also not limited to the above-described metal materials, and other conductive material may be selected as the material of the internal electrode layers 14.

Here, referring to FIGS. 3 to 5, as terms representing the orientations of the multilayer ceramic capacitor 10, the direction in which the pair of external electrodes 16 are arranged is defined as a length direction L of the multilayer ceramic capacitor 10, the lamination direction of the dielectric layers 13 and the internal electrode layers 14 is defined as a thickness direction T (hereinafter, also referred to as the lamination direction), and the direction orthogonal or substantially orthogonal to both the length direction L and the thickness direction T is defined as a width direction W.

Furthermore, among the six outer surfaces of the multilayer ceramic capacitor 10 having a rectangular or substantially rectangular parallelepiped shape, a pair of outer surfaces opposed to each other in the length direction L are defined as end surfaces 10a, a pair of outer surfaces opposed to each other in the thickness direction T are defined as main surfaces 10b, and a pair of outer surfaces opposed to each other in the width direction W are defined as side surfaces 10c.

Furthermore, referring to FIGS. 6 and 7, a pair of outer surfaces of the base body 11 corresponding to the pair of end surfaces 10a of the multilayer ceramic capacitor 10 are defined as end surfaces 11a, and a pair of outer surfaces of the laminate chip 22 corresponding to the pair of end surfaces 10a of the multilayer ceramic capacitor 10 are defined as end surfaces 22a, a pair of outer surfaces of the base body 11 corresponding to the pair of main surfaces 10b of the multilayer ceramic capacitor 10 are defined as main surfaces 11b, and a pair of outer surfaces of the laminate chip 22 corresponding to the pair of main surfaces 10b of the multilayer ceramic capacitor 10 are defined as main surfaces 22b, and a pair of outer surfaces of the base body 11 corresponding to the pair of side surfaces 10c of the multilayer ceramic capacitor 10 are defined as side surfaces 11c, and a pair of outer surfaces of the laminate chip 22 corresponding to the pair of side surfaces 10c of the multilayer ceramic capacitor 10 are defined as side surfaces 22c.

It should be noted that, as shown in FIGS. 3 to 5, the multilayer ceramic capacitor 10 according to the present preferred embodiment has an elongated rectangular or substantially rectangular parallelepiped shape in which the outer dimension in the length direction L is the longest. The representative values of the outer dimension in the thickness direction T and the outer dimension in the width direction W of the multilayer ceramic capacitor 10 (normally, the outer dimension in the thickness direction T is equivalent to that in the width direction W) preferably satisfy about $W/T \geq 1.06$ $W+0.14$, for example. The specific dimensions of W×T are, for example, about 0.3 mm×about 0.5 mm and about 0.5 mm×about 0.8 mm.

As shown in FIG. 6, the pair of additional dielectric portions 15 cover the pair of outer surfaces opposed in the width direction W of the multilayer body 12 so as to define the pair of side surfaces 11c of the base body 11. On the other hand, the pair of end surfaces 11a of the base body 11 mainly include a pair of outer surfaces of the multilayer body 12 opposed to each other in the length direction L, and the pair of main surfaces 11b of the base body 11 mainly include a pair of outer surfaces of the multilayer body 12 opposed to each other in the thickness direction T.

As shown in FIG. 7, in the present preferred embodiment, the multilayer body 12 mainly includes the laminate chip 22 which is formed by laminating a plurality of material sheets on which a conductive pattern 24 is printed and which defines and functions as the internal electrode layers 14 on the surfaces of laminated ceramic green sheets 23 defining and functioning as the dielectric layers 13, and dividing the resulting sheets, thus having a rectangular or substantially rectangular parallelepiped shape as illustrated. The conductive pattern 24 is an example of an internal electrode pattern.

At the pair of end surfaces 22a of the laminate chip 22, a portion of each of the laminated conductive patterns 24 is selectively exposed. More specifically, end portions on one side in the length direction L of the conductive patterns 24 to be connected to the external electrode 16 which is to be formed so as to cover the end surface 22a are each exposed at the pair of end surfaces 22a of the laminate chip 22.

On the other hand, at the pair of side surfaces 22c of the laminate chip 22, the end portions of all of the laminated conductive patterns 24 in the width direction W are exposed. Furthermore, at the pair of side surfaces 22c of the laminate chip 22, the end portions of all of the laminated conductive patterns in the width directions W are aligned in the lamination direction T. Thus, as shown in FIG. 5, in the multilayer ceramic capacitor 10, the ends in the width direction W of the plurality of internal electrode layers 14 are aligned in the lamination direction T so as to be positioned within the range of, for example, about 5 μm in the width direction W.

A coating ceramic green sheet defining and functioning as the additional dielectric portion 15 is attached to each of the pair of side surfaces 22c of the laminate chip 22 and covers each of the pair of side surfaces 22c of the laminate chip 22. Thus, the end portions in the width direction W of the conductive pattern 24 which are exposed at the pair of side surfaces 22c of the laminate chip 22 described above are covered by the coating ceramic green sheet, and the laminate chip 22 in a state in which the coating ceramic green sheets are attached is fired and subjected to thermocompression bonding, such that the base body 11 as shown in FIG. 6 is produced.

The thickness of the main surface 11b of the base body 11, i.e., the thickness of the dielectric layer 13 of the main surface 10b of the multilayer ceramic capacitor 10, is preferably about 5 μm or more and about 30 μm or less, and more preferably, about 5 μm or more and about 20 μm or less, for example. The thickness of the dielectric layer 13 of the main surface 10b refers to the thickness from the main surface 10b to the internal electrode layer 14 located closest to the main surface 10b. On the other hand, the thickness of the side surface 11c of the base body 11, i.e., the thickness of the additional dielectric portion 15 of the side surface 10c of the multilayer ceramic capacitor 10, is preferably about 5 μm or more and about 30 μm or less, and more preferably about 5 μm or more and about 20 μm or less, for example. The thickness of the additional dielectric portion 15 of the side surface 10c refers to the thickness from the side surface 10c to the end of the internal electrode layer 14 close to the side surface 10c.

In the multilayer ceramic capacitor 10 described above, the dielectric layers located at both ends in the width direction W of the base body 11 each include the coating ceramic green sheet which is pasted so as to cover the pair of outer surfaces opposing in the width direction W of the multilayer body 12 and which defines and functions as the additional dielectric portion 15 after firing the coating ceramic green sheet. Therefore, by sufficiently thinning the coating ceramic green sheets to be pasted, it is possible to reduce the thickness of the dielectric layers of the portions of the side surfaces 10c of the multilayer ceramic capacitor 10.

Therefore, by providing such a structure, it is possible to increase the effective area (the area of the portion where the pair of internal electrode layers 14 adjacent to each other face each other with the dielectric layer 13 interposed therebetween in the lamination direction) by increasing the size of the internal electrode layers 14 in the width direction W with respect to the entire size, such that it is possible to manufacture a multilayer ceramic capacitor which is small but has a large capacity, as compared to the conventional multilayer ceramic capacitors.

In such a multilayer ceramic capacitor 10, due to the difference in thickness between the dielectric layers 13 of the main surface 10b and the additional dielectric portion 15 of the side surface 10c, or the difference in material, the density in the main surface 10b and the side surface 10c, in other words, porosity, may be different. The density is calculated by "100 (volume %)−porosity (volume %)", and "porosity (volume %)" refers to the average value of the ratios of the porous area measured at twenty or more locations observed in the plane of about 10 μm in length and width when observing a cross-sectional polished surface of the base body after firing by a scanning electron microscope (SEM). By increasing the number of measurements, it is possible to approximate the porosity of the entire base body after firing. As described above, since the density and the porosity have a correlation, and the simplest method of obtaining the difference in the density is to obtain the difference in the porosity, hereinafter, the porosity of the main surface and the side surface is measured, instead of the density of the main surface and the side surface, and the difference in the density shall be equivalent to the difference in the porosity.

For example, according to the thickness and material of the dielectric layer 13 of the main surface 10b described above, the porosity of the main surface 10b is, for example, about 1% or more and about 4% or less, in other words, the density of the main surface 10b is about 96% or more and about 99% or less. Furthermore, according to the thickness and the material of the additional dielectric portion 15 of the side surface 10c described above, the porosity of the side surface 10c is, for example, about 0% or more and about 0.5% or less, in other words, the density of the side surface 10c is about 99.5% or more and about 100% or less. According to the above, the difference between the density of the main surface 10b and the density of the side surface 10c is, for example, about 0.5% or more. That is, there is a difference in density, in other words, porosity, of at least about 0.5% between the main surface 10b and the side surface 10c of the multilayer ceramic capacitor 10. It should be noted that the porosity of the main surface 10b may be, for example, about 0% or more and about 0.5% or less, the porosity of the side surface 10c may be, for example, about 1% or more and about 4% or less, and the difference between the density of the main surface 10b and the density of the side surface 10c may be, for example, about 0.5% or more.

Furthermore, the densities, in other words, porosities, of the two main surfaces 10b may be the same or substantially the same. Similarly, the densities, i.e., porosities, of the two side surfaces 10c may be the same or substantially the same. Furthermore, the difference between the densities of the two main surfaces 10b may be smaller than the difference between the densities of the main surface 10b and the densities of the side surface 10c. Similarly, the difference between the densities of the two side surfaces 10c may be smaller than the difference between the densities of the main surface 10b and the side surface 10c.

Multilayer Ceramic Capacitor Package

Figure 2:
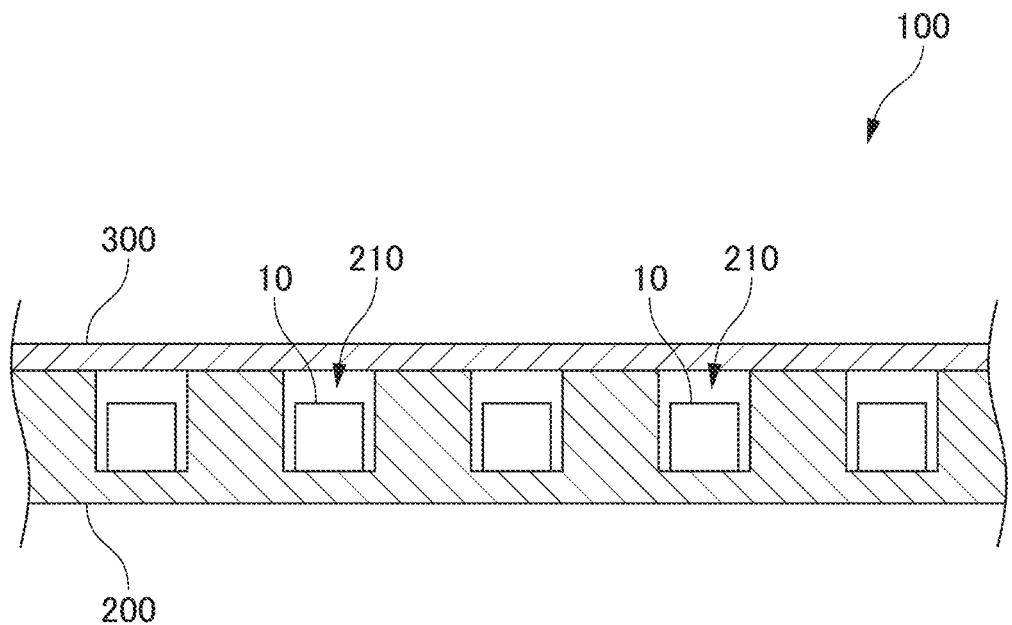
FIG. 2 is a cross-sectional view along the line II-II of the multilayer ceramic capacitor package shown in FIG. 1.

Next, a multilayer ceramic capacitor package accommodating the multilayer ceramic capacitor 10 described above according to the present preferred embodiment will be described with reference to FIGS. 1 and 2. FIG. 1 is a plan view showing a multilayer ceramic capacitor package 100 according to the present preferred embodiment, and FIG. 2 is a cross-sectional view along the line II-II of the multilayer ceramic capacitor package 100 shown in FIG. 1. As shown in FIGS. 1 and 2, the multilayer ceramic capacitor package 100 includes a carrier tape 200, a cover tape 300, and a plurality of multilayer ceramic capacitors 10.

The carrier tape 200 is an elongated or strip-shaped member. The carrier tape 200 includes a plurality of pockets 210 therein, and the plurality of pockets are at equal or substantially equal intervals in the longitudinal direction. Each of the pockets 210 is a concave recess to accommodate the multilayer ceramic capacitor 10, and includes an opening for removing the multilayer ceramic capacitor. Although the material of the carrier tape 200 is not particularly limited, for example, a resin, paper, or the like can be used.

It should be noted that the carrier tape 200 of a typical multilayer ceramic capacitor includes 5,000 or more pockets. That is, a typical multilayer ceramic capacitor package 100 accommodates 5,000 or more multilayer ceramic capacitors 10. Furthermore, since the multilayer ceramic capacitors are provided in series, the multilayer ceramic capacitor package 100 is sometimes referred to as a multilayer ceramic capacitor series.

The cover tape 300 is an elongated or strip-shaped member. The cover tape 300 is attached to the carrier tape 200 so as to cover the openings of the plurality of pockets 210. Thus, each multilayer ceramic capacitor 10 is sealed in each pocket 210. The cover tape 300 is peelably attached to the carrier tape 200. Although the material of the cover tape 300 is not particularly limited, for example, a resin, paper, or the like can be used.

The plurality of multilayer ceramic capacitors 10 are respectively accommodated in the plurality of pockets 210 of the carrier tape 200. More specifically, all of the multilayer ceramic capacitor 10 are arranged so that one of the pair of main surfaces 10b thereof is positioned close to the opening side of the pocket 210. As a result, in the adjacent multilayer ceramic capacitors 10, the difference in the densities of the surfaces on the opening side of the pockets 210 is, for example, about 0% or more and about 4% or less, and preferably about 0% or more and about 3% or less. Furthermore, in all of the multilayer ceramic capacitors 10, the difference in the densities of the surfaces on the opening side of the pockets 210 falls within the range of, for example, about 0% or more and about 4% or less, and preferably within the range of about 0% or more and about 3% or less.

Alternatively, all of the multilayer ceramic capacitor 10 are arranged so that one of the pair of side surfaces 10c is positioned close to the opening side of the pocket 210. Thus, in the adjacent multilayer ceramic capacitor 10, the difference in densities of the surfaces of the opening side of the pockets 210 is, for example, about 0% or more about 0.5% or less. Furthermore, in all of the multilayer ceramic capacitor 10, the difference in the densities of the surfaces of the opening side of the pockets 210 falls within the range of, for example, about 0% or more and about 0.5% or less.

In the multilayer ceramic capacitor package 100 described above, the multilayer ceramic capacitors 10 are removed one by one from the pocket 210 of the carrier tape 200, and are mounted on a mounting board or the like. More specifically, the cover tape 300 is gradually peeled from the carrier tape 200 in the longitudinal direction. Next, the surface of the multilayer ceramic capacitor 10 is sucked using a mounter from the opening of the pocket 210 of the carrier tape 200 to remove the multilayer ceramic capacitor 10 from the pocket 210 of the carrier tape 200. Next, the multilayer ceramic capacitor 10 is mounted on the mounting board or the like by releasing the adsorption of the mounter.

Here, conventionally, upon mounting a multilayer ceramic capacitor on a mounting board or the like using a mounter, when the multilayer ceramic capacitor is removed from the pocket by the surface of the multilayer ceramic capacitor being sucked from the opening side of the pocket by the mounter, the surface of the multilayer ceramic capacitor is sometimes cracked.

Concerning this problem, the inventors of preferred embodiments of the present invention have discovered that variations in the density of the surface of the opening side of the pocket 210 in the multilayer ceramic capacitor 10, in other words, variations in porosity, are one of the causes of cracking. More specifically, the inventors of preferred embodiments of the present invention have discovered that variations in the density, in other words, variations in porosity, between the main surface and the side surface of the multilayer ceramic capacitor 10 including the side gap portions described above, and furthermore, the variation as to whether the surface of the opening side of the pocket 210 in the multilayer ceramic capacitor 10 is the main surface or the side surface, are causes of cracking.

The multilayer ceramic capacitor 10 accommodated in the pocket 210 is sucked by the mounter with a certain suction force. The optimum value of the certain suction force depends on the density, in other words, porosity, of the surface of the multilayer ceramic capacitor 10. When the suction force is set on the assumption of a surface having a high density, in other words, a surface having a low porosity, then if a surface having a low density, in other words, a surface having a high porosity, is sucked by this suction force, since the suction force will be too high, a surface having a low density, in other words, a surface having a high porosity, may crack. Alternatively, when the suction force at the time of mounting the mounter is set on the assumption of a surface having a high density, in other words, a surface having a low porosity, then if the surface having a low density, in other words, a surface having a high porosity, is mounted by this suction force, since the mounting force will be too high, a surface having a low density, in other words, a surface having a high porosity, may crack. Therefore, the density, in other words, the porosity, of the surface on the opening side of the pocket 210 should not vary.

Therefore, according to the multilayer ceramic capacitor package 100 of the present preferred embodiment, in the adjacent multilayer ceramic capacitor 10 of the plurality of multilayer ceramic capacitor 10, the difference in densities of the surfaces of the opening side of the pockets 210 is, for example, about 0% or more and about 4% or less, and preferably about 0% or more and about 3% or less. For example, all of the multilayer ceramic capacitor 10 are arranged so that the main surface 10b is positioned close to the surface of the opening side of the pocket 210. Alternatively, all of the multilayer ceramic capacitor 10 are arranged so that the side surface 10c is positioned close to the opening side of the pocket 210. Thus, in the plurality of multilayer ceramic capacitor 10, the density, in other words, the porosity, of the surface of the opening side of the pocket 210 becomes uniform or substantially uniform. Therefore, when mounting by sucking the multilayer ceramic capacitor 10 using a mounter, it is possible to reduce the cracking on the surface of the multilayer ceramic capacitor 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor package accommodating a plurality of multilayer ceramic capacitors, the multilayer ceramic capacitor package comprising:
   a carrier tape that is elongated and includes a plurality of recess pockets at equal or substantially equal intervals in a longitudinal direction;
   a cover tape that is elongated and attached to the carrier tape to cover an opening of each of the plurality of pockets; and
   the plurality of multilayer ceramic capacitors respectively accommodated in the plurality of pockets; wherein
   in adjacent multilayer ceramic capacitors among the plurality of multilayer ceramic capacitors, a difference in densities of surfaces on an opening side of the pockets is about 0% or more and about 4% or less.

2. The multilayer ceramic capacitor package according to claim 1, wherein
   each of the plurality of multilayer ceramic capacitors includes:
      a dielectric made of a ceramic material;
      a plurality of internal electrodes provided in the dielectric; and
      a pair of external electrodes coupled to the plurality of internal electrodes;
   each of the plurality of multilayer ceramic capacitors further includes:
      a pair of main surfaces opposing each other in a lamination direction of the plurality of internal electrodes;
      a pair of side surfaces opposing each other in a width direction intersecting with the lamination direction; and
      a pair of end surfaces opposing each other in a length direction intersecting with the lamination direction and the width direction, and respectively including the pair of external electrodes thereon; and
   in the plurality of multilayer ceramic capacitors, the surfaces on the opening side of the pockets are located at one of the pair of main surfaces.

3. The multilayer ceramic capacitor package according to claim 1, wherein
   each of the plurality of multilayer ceramic capacitors includes:
      a dielectric made of a ceramic material;
      a plurality of internal electrodes provided in the dielectric; and
      a pair of external electrodes coupled to the plurality of internal electrodes;
   each of the plurality of multilayer ceramic capacitors further includes:
      a pair of main surfaces opposing each other in a lamination direction of the plurality of internal electrodes;
      a pair of side surfaces opposing each other in a width direction intersecting with the lamination direction; and
      a pair of end surfaces opposing each other in a length direction intersecting with the lamination direction and the width direction, and respectively including the pair of external electrodes thereon; and
   in the plurality of multilayer ceramic capacitors, the surfaces on the opening side of the pockets are located at one of the pair of side surfaces.

4. The multilayer ceramic capacitor package according to claim 2, wherein in each of the plurality of multilayer ceramic capacitors, ends of the plurality of internal electrodes in the width direction are arranged in the lamination direction so as to be located within a range of about 5 µm in the width direction, and a difference between a density of the pair of main surfaces and a density of the pair of side surfaces is about 0.5% or more.

5. The multilayer ceramic capacitor package according to claim 2, wherein
   a difference in density of the surfaces on the opening side of the pockets is equivalent or substantially equivalent to a difference in porosity of the surfaces on the opening side of the pockets; and
   in each of the plurality of multilayer ceramic capacitors, a porosity of the pair of main surfaces is about 1% or more and about 4% or less.

6. The multilayer ceramic capacitor package according to claim 2, wherein
   a difference in density of the surfaces on the opening side of the pockets is equivalent or substantially equivalent to a difference in porosity of the surfaces on the opening side of the pockets; and
   in each of the plurality of multilayer ceramic capacitors, a porosity of the pair of side surfaces is about 0% or more and about 0.5% or less.

7. The multilayer ceramic capacitor package according to claim 1, wherein
   a number of sets of the plurality of pockets and the plurality of multilayer ceramic capacitors is 5,000 or more; and
   in the plurality of multilayer ceramic capacitors, a difference in density of the surfaces on the opening side of the pockets is within a range of about 0% or more to about 4% or less.

8. The multilayer ceramic capacitor package according to claim 2, wherein each of the pair of external electrodes includes a laminated film including a sintered metal layer and a plated layer on the sintered metal layer.

9. The multilayer ceramic capacitor package according to claim 8, wherein the sintered metal layer includes at least one of Cu, Ni, Ag, Pd, Ag—Pd alloy, or Au.

10. The multilayer ceramic capacitor package according to claim 8, wherein the plated layer includes a Ni-plating layer and a Sn-plating layer covering the Ni-plating layer.

11. The multilayer ceramic capacitor package according to claim 3, wherein each of the pair of external electrodes includes a laminated film including a sintered metal layer and a plated layer on the sintered metal layer.

12. The multilayer ceramic capacitor package according to claim 11, wherein the sintered metal layer includes at least one of Cu, Ni, Ag, Pd, Ag—Pd alloy, or Au.

13. The multilayer ceramic capacitor package according to claim 11, wherein the plated layer includes a Ni-plating layer and a Sn-plating layer covering the Ni-plating layer.

14. The multilayer ceramic capacitor package according to claim 2, wherein
   the dielectric includes a plurality of dielectric layers; and
   the plurality of dielectric layers and the plurality of internal electrodes are laminated alternately in the lamination direction.

15. The multilayer ceramic capacitor package according to claim 2, wherein each of the ceramic material includes barium titanate as a main component.

16. The multilayer ceramic capacitor package according to claim 3, wherein
   the dielectric includes a plurality of dielectric layers; and
   the plurality of dielectric layers and the plurality of internal electrodes are laminated alternately in the lamination direction.

17. The multilayer ceramic capacitor package according to claim 3, wherein each of the ceramic material includes barium titanate as a main component.

18. The multilayer ceramic capacitor package according to claim 2, wherein each of the plurality of internal electrodes includes at least one of Ni, Cu, Ag, Pd, Ag—Pd alloy, or Au.

19. The multilayer ceramic capacitor package according to claim 3, wherein each of the plurality of internal electrodes includes at least one of Ni, Cu, Ag, Pd, Ag—Pd alloy, or Au.

\* \* \* \* \*